United States Patent [19]

Ziv-Av

[11] Patent Number: 5,633,024
[45] Date of Patent: May 27, 1997

[54] CLAMPING ASSEMBLY FOR INJECTION MOLDING APPARATUS

[76] Inventor: Amir Ziv-Av, 3 Hanasi, Kiryat Ono, Israel

[21] Appl. No.: 568,906

[22] Filed: Dec. 7, 1995

[51] Int. Cl.⁶ .................................................. B29C 45/64
[52] U.S. Cl. ..................... 425/589; 100/231; 100/258 A; 425/450.1; 425/451.9; 425/595
[58] Field of Search ..................................... 425/589, 595, 425/450.1, 451.9; 100/231, 258 A

[56] References Cited

U.S. PATENT DOCUMENTS

| | | | |
|---|---|---|---|
| 5,249,951 | 10/1993 | Leonhartsberger et al. | 425/589 |
| 5,354,196 | 10/1994 | Ziv-Av | 425/589 |

FOREIGN PATENT DOCUMENTS 0 311 133 B1  4/1991  European Pat. Off. .

*Primary Examiner*—James P. Mackey
*Attorney, Agent, or Firm*—Mark M. Friedman

[57] ABSTRACT

A clamping assembly for injection molding apparatus which includes a base frame and a pair of support posts, each formed with a cutout. A fixed platen is connected to, or is integrally formed with, one of the support posts while a movable platen is connected to the other support post. Finally, a support structure is provided over which the movable platen slides. In one embodiment, the support structure is a floating support which is connected to the two support posts.

19 Claims, 4 Drawing Sheets

CLAMPING ASSEMBLY FOR INJECTION MOLDING APPARATUS

FIELD AND BACKGROUND OF THE INVENTION

The present invention relates to clamping assemblies for injection molding apparatus, and, more particularly, to structures which ensure that the two portions of the injection molding mold remain together during the injection of molten plastic.

A typical injection molding machine features a fixed platen and a complementary movable platen. The two platens are designed to come together so as to form between them a multi-part, typically a two-part, mold. The two platens are pressed together through the use of a suitable driven ram, such as a hydraulic piston or toggle mechanism, and the like. With the two parts of the mold held firmly together, a molten plastic is injected under great pressure into the mold, thereby filling it. Once the plastic has cooled and hardened, the two parts of the mold are separated and the finished item is removed prior to repetition of the cycle.

Because of the high pressures under which the molten plastic is injected it is imperative that the two parts of the mold be very firmly and accurately held together. Thus, in order to prevent the escape of molten plastic and the attendant deterioration in the quality of the injection molded product, it is essential that the two parts remain accurately aligned with each other even when the two parts are pushed together using high pressure.

For many years, and to a large extent even today, the accurate alignment of the fixed and movable platens was assured through the use of four tiebars. In other words, the square or rectangular movable platen features openings, typically near each of its four corners. Each opening slidably accommodates a tiebar which is firmly attached to the fixed platen. The movable platen is thus slidably supported by the tiebars which assure the proper alignment of the two platens even when the two platens are forced together under great pressure.

While the tiebars are effective in preserving the alignment of the platens, they do so at great cost. Thus, the presence of the tie bars in the region of the mold significantly reduces the portion of the mold available for molding and, perhaps more importantly, considerably complicates the manual or automatic removal of the product as well as the changing of the molds.

Several attempts have been made to provide an injection molding clamping assembly which dispenses with the troublesome tiebars. One of these is disclosed in U.S. Pat. No. 5,354,196 to Ziv-Av et al.

U.S. Pat. No. 5,354,196 discloses a clamping assembly which includes a base to which the fixed platen is connected and a clamping structure which nests within the base and which supports the movable platen. The base and clamping structure are arranged so that when pressure is applied to force the two platens together the clamping structure absorbs the force, keeps the base from bending and ensures a tight fit between the two platens.

Another clamping assembly which does away with the tiebars was disclosed by Hemscheidt Maschinentechnik Schwerin GmbH & Co at the K-95 Exhibition in Dusseldorf, Germany on or about October, 1995. The Hemscheidt device can be constructed so that when the two platens are forced together under great pressure, causing the outward bending of the support posts, the portion of the support posts which supports the platens bends in the opposite sense, thereby tending to compensate for the outward bending of the support posts and tending to maintain the horizontal alignment of the two platens.

While the existing configurations represent great improvements over the tiebar-based approach, there remains a widely recognized need for, and it would be highly advantageous to have, a reliable and tiebar-less clamping assembly for injection molding apparatus which effectively maintains the horizontal alignment of the platens and which further is able to accurately slidably support the movable platen.

SUMMARY OF THE INVENTION

According to the present invention there is provided a clamping assembly, comprising: (a) a base frame having a first end and a second end; (b) a first support post connected to, or integrally formed with, the first end of the base frame, the first support having a first cutout; (c) a fixed platen connected to, or integrally formed with, the first support post; (d) a second support post connected to, or integrally formed with the second end of the base frame, the second support having a second cutout; (e) a movable platen movably connected to the second support post; and (f) a support structure for slidably supporting the movable platen.

According to further features in preferred embodiments of the invention described below, an upper portion of each of the first and second support posts located substantially above the first and second cutouts extends substantially horizontally so that a horizontally applied force tends to compress the upper portion while a lower portion of the first and second support posts located substantially below the first and second cutouts extends in an arcuate manner so that the horizontally applied force tends to bend, as well as compress, the lower portion.

Also according to the present invention, there is provided a clamping assembly for injection molding apparatus, comprising: (a) a base frame having a first end and a second end; (b) a first support post connected to, or integrally formed with, the first end of the base frame; (c) a fixed platen connected to, or integrally formed with, the first support post; (d) a second support post connected to, or integrally formed with the second end of the base frame; (e) a movable platen movably connected to the second support post; and (f) a support structure for slidably supporting the movable platen, the support structure being a floating support connected to the first and second support posts.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a clamping assembly for use with injection molding machinery which can be used to ensure that the fixed and movable platens remain properly aligned with each other.

The principles and operation of a system according to the present invention may be better understood with reference to the drawings and the accompanying description.

Figure 1:
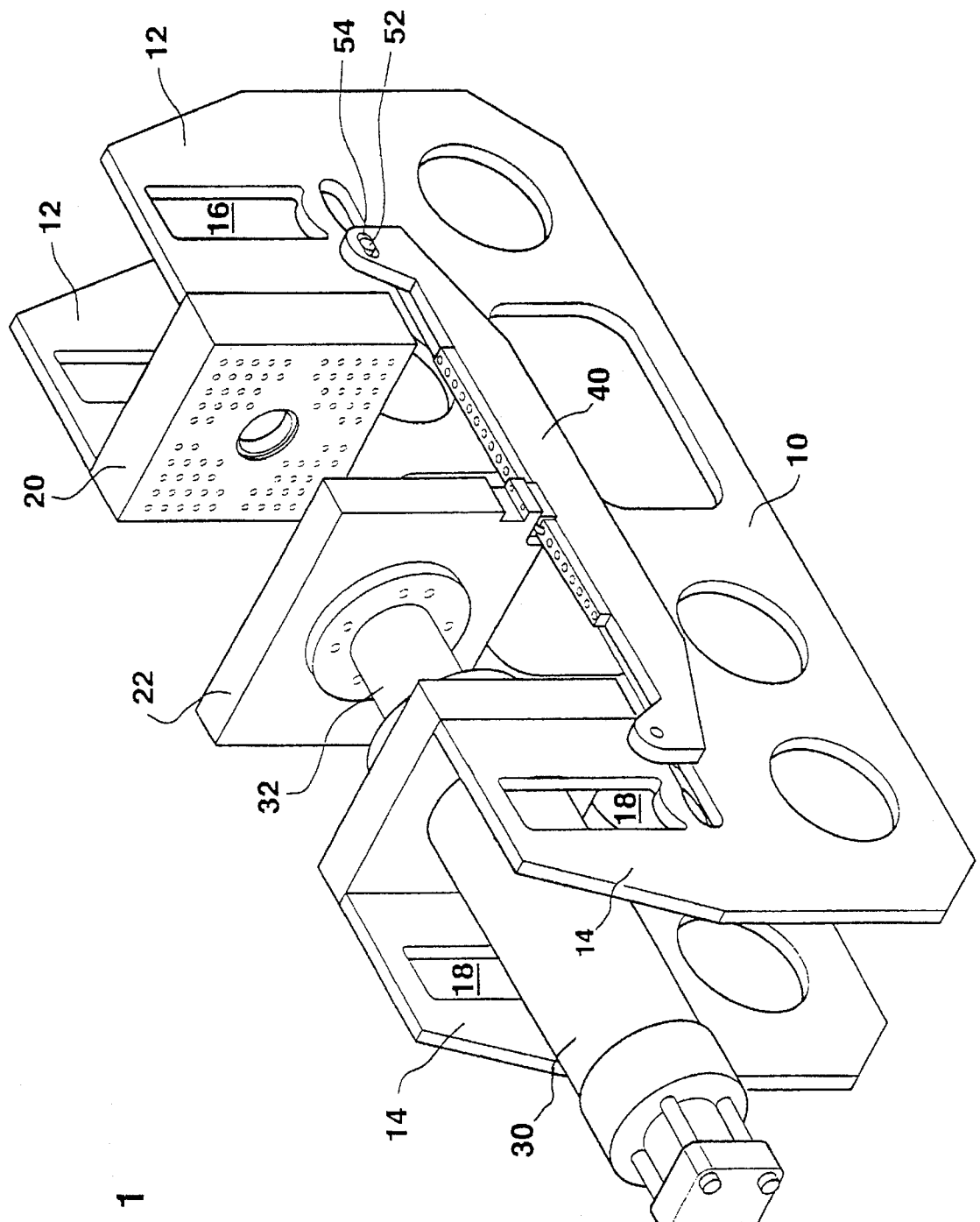
FIG. 1 is a perspective view of a clamping assembly according to the present invention.

Referring now to the drawings, FIG. 1 illustrates a portion of an illustrative injection molding system incorporating a clamping assembly according to the present invention. The clamping assembly includes a base frame 10.

Connected to base frame 10 or, preferably, integrally formed with it, are support posts which extend upward from base frame 10 at or near the two ends of base frame 10. Thus, extending from base frame 10 is a first support post 12 and a second support post 14. Preferably, and as shown in FIG. 1, each of support posts 12 and 14 is made up of a pair of members, with one member of each pair disposed laterally at one side of the device.

First support post 12 preferably includes a first cutout 16 while second support post 14 preferably includes a second cutout 18. One or both of cutouts 16 and 18 may be constructed by cutting out a portion of first and second support ports 12 and 14 or may each be made up of two or more members assembled together in some suitable fashion. Furthermore, the material forming the borders of cutouts 16 and 18 may be the same as the material of construction of supports posts 12 and 14 or may be different. Indeed, different materials may be found on different sides of cutouts 16 and 18 as is the case, for example, with the embodiments of FIG. 4 which are described below. The term 'cutout' as used herein in the specification and claims is used to include all the various possible configurations, regardless of whether the 'cutout' structure is actually cutout from the posts or is assembled in any other way, including using various materials. The geometry and function of cutouts 16 and 18 are described below.

The assembly further includes a fixed platen 20 which is connected to, or is integrally formed with, first support post 12. Fixed platen 20 forms, or can be connected to, a portion of the mold.

The assembly further includes a movable platen 22 which is connected to second support post 14 in such a way that movable platen 22 can be moved slidably relative to second support post 14. The movement of movable platen 22 can be effected by any suitable means, including but not limited to, mechanical or electrical means. Shown in FIG. 1 is a driven ram, such as a hydraulic piston or toggle mechanism, and the like, 30 which is connected to a piston drive rod 32 which is, in turn, connected to movable platen 22. Movable platen 22 forms, or can be connected to, a complementary portion of the mold which is designed to mate with the portion of the mold which is, or which can be connected to, fixed platen 20.

A clamping assembly according to the present invention further includes a horizontal movement support structure 40 which is designed to slidably support movable platen 22 so as to allow movable platen 22 to slide accurately in the horizontal direction while being suitably supported in the vertical direction.

Horizontal movement support structure 40 may be of any number of designs. Typically, support structure 40 includes a structural beam on which is mounted, or which is formed with, a linear bearing of suitable design on which movable platen 22 can slide. Preferably, support structure 40 is a floating support assembly which is directly or indirectly connected to first support post 12 and is directly or indirectly connected to second support post 14. An indirect connection to first support post 12 may be effected, for example, through connection to fixed platen 20 while an indirect connection to second support post 14 may be effected through connection to the support structure of movable platen 14. As used herein, the connection to first support post 12 and second support post 14 is intended to include both direct and indirect connection. A support structure according to the present invention may also beneficially be used in conjunction with clamping assemblies which do not feature support posts having cutouts.

During operation, when movable platen 22 is pressed with great force onto fixed platen 20, first and second support posts 12 and 14 will tend to displace from their rest position. As explained below, the displacement will be such that the alignment of fixed and movable platens 20 and 22 will remain unchanged. However, first and second support posts 12 and 14 will both displace slightly away from each other relative to their rest position. To accommodate this slight axial displacement, it is preferable that at least one of the connections support structure 40 with first support post 12 (or fixed platen 20) and second support post 14 be at least somewhat movable in the horizontal direction. The movability of the connection can be effected in any of a number of suitable ways, such as, for example, through a slidable connection.

A more specific example of such a sliding connection is illustrated in FIG. 1. Here, the connection between support structure 40 and second support post 14 is a firm connection while the connection with first support post 12 is a sliding connection. In the sliding connection of FIG. 1, first support post 12 features a laterally extending protrusion 52 while sliding contact bearing 40 features a complementary slot 54 in which protrusion 52 is slidable. Protrusion 52 and slot 54 constitute the slidable connection between sliding contact bearing 40 and first support post 12.

As stated above, first support post 12 preferably features first cutout 16 while second support post 14 preferably features second cutout 18. Cutouts 16 and 18 can have any suitable shape but are preferably substantially rectangular in shape.

Figure 2:
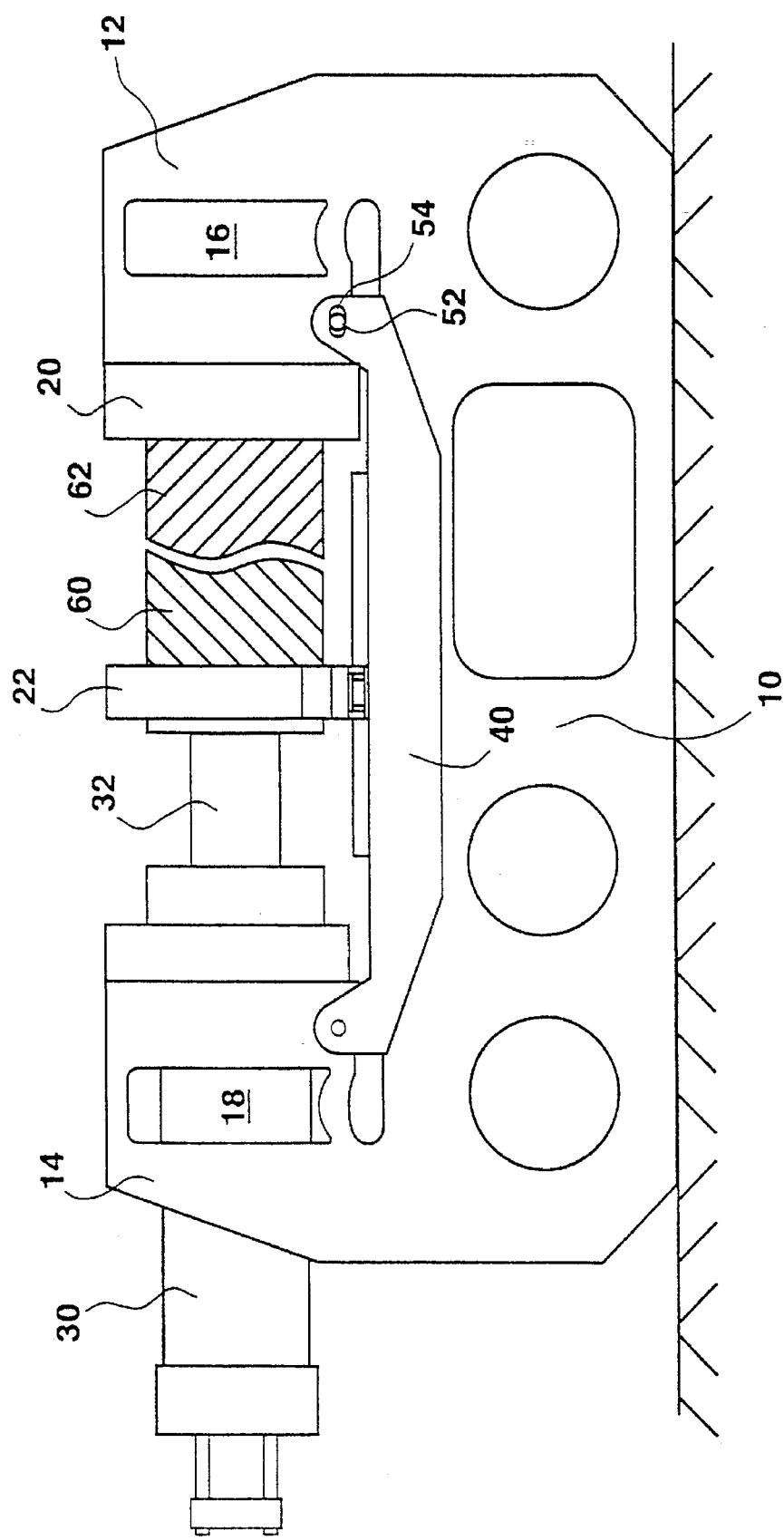
FIG. 2 is a from view of the clamping assembly of FIG. 1 when the two platens are not pressed together.
Figure 3:
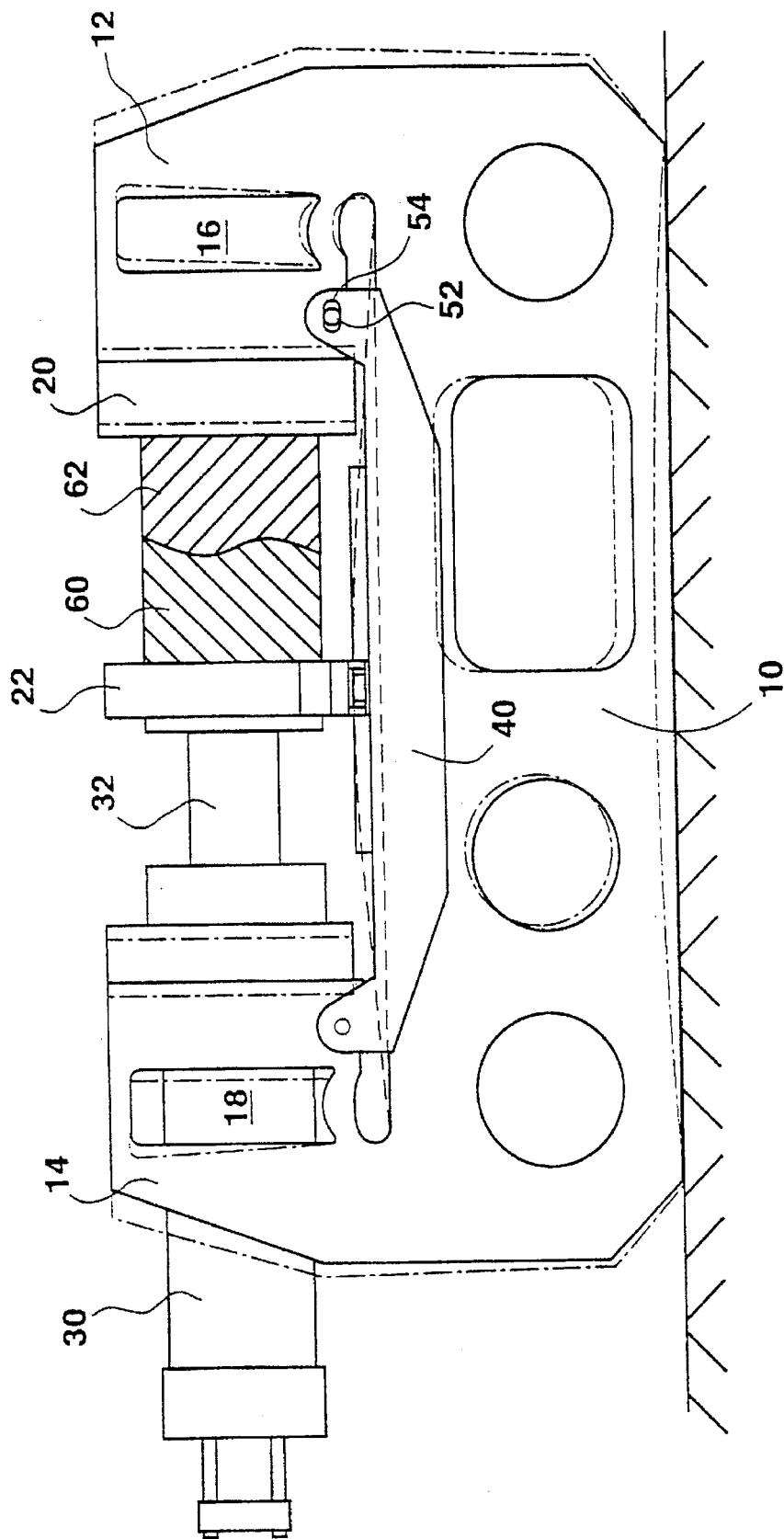
FIG. 3 is a from view of the clamping assembly of FIG. 1 when the two platens are pressed together.

The geometry and operation of cutouts 16 and 18 can best be understood with reference to FIGS. 2 and 3. FIGS. 2 and 3 are front views of an assembly, such as that of FIG. 1, with FIG. 2 showing the rest position, with the complementary parts of the two-part mold, 60 and 62, apart, and FIG. 3 showing a comparison of the position of the assembly in the rest position (solid lines) and in the stressed position (broken lines), i.e., when movable platen 22 is firmly pressed against fixed platen 20.

As can be seen in FIG. 3, when platens 20 and 22 are pressed firmly together there is a tendency for support posts 12 and 14 to rotate slightly outward away from each other accompanied by a slight raising of the central portion of base frame 10. The outward rotation of support posts 12 and 14 would, in the absence of any correcting mechanism, tend to misalign the two parts of mold, 60 and 62, so that they are no longer accurately complementary. This misalignment could bring about the escape of molten plastic from the mold or at least the undesirable flow dynamic in the mold which could result in streaking and otherwise less desirable product.

To compensate for the outward rotation of support posts 12 and 14, support posts 12 and 14 feature cutouts, 16 and 18, respectively, which are designed to provide a rotation of support posts 12 and 14 in the opposite sense and to substantially the same extent, as the outward rotation of support posts 12 and 14. This may be accomplished as follows.

The portion of each of support posts 12 and 14 located substantially above the respective cutouts 16 and 18 extends substantially horizontally so that a horizontally applied force, such as that which would be generated when platens 20 and 22 are forced together, tends to slightly compress these portions of support posts 12 and 14.

By contrast, the portion of each of support posts 12 and 14 located substantially below the respective cutouts 16 and 18 extends substantially in an arcuate manner so that a horizontally applied force, such as that which would be generated when platens 20 and 22 are forced together, tends to slightly compress but, to a much larger extent, also bend, these portions of support posts 12 and 14. This bending causes support posts 12 and 14 to rotate toward each other, offsetting the tendency of support posts 12 and 14 to rotate outwardly, thereby maintaining the desired relative orientation of platens 20 and 22.

The proper design of an assembly according to the present invention, i.e., a design which will cause the opposing rotations of supports posts 12 and 14 to offset each other for a given operational force, will take into account various factors, including, for example, the expected force, the strength of the materials involved, the thickness of the posts, and the exact geometry of the cutouts and the portions of the posts surrounding the cutouts.

Figure 4:
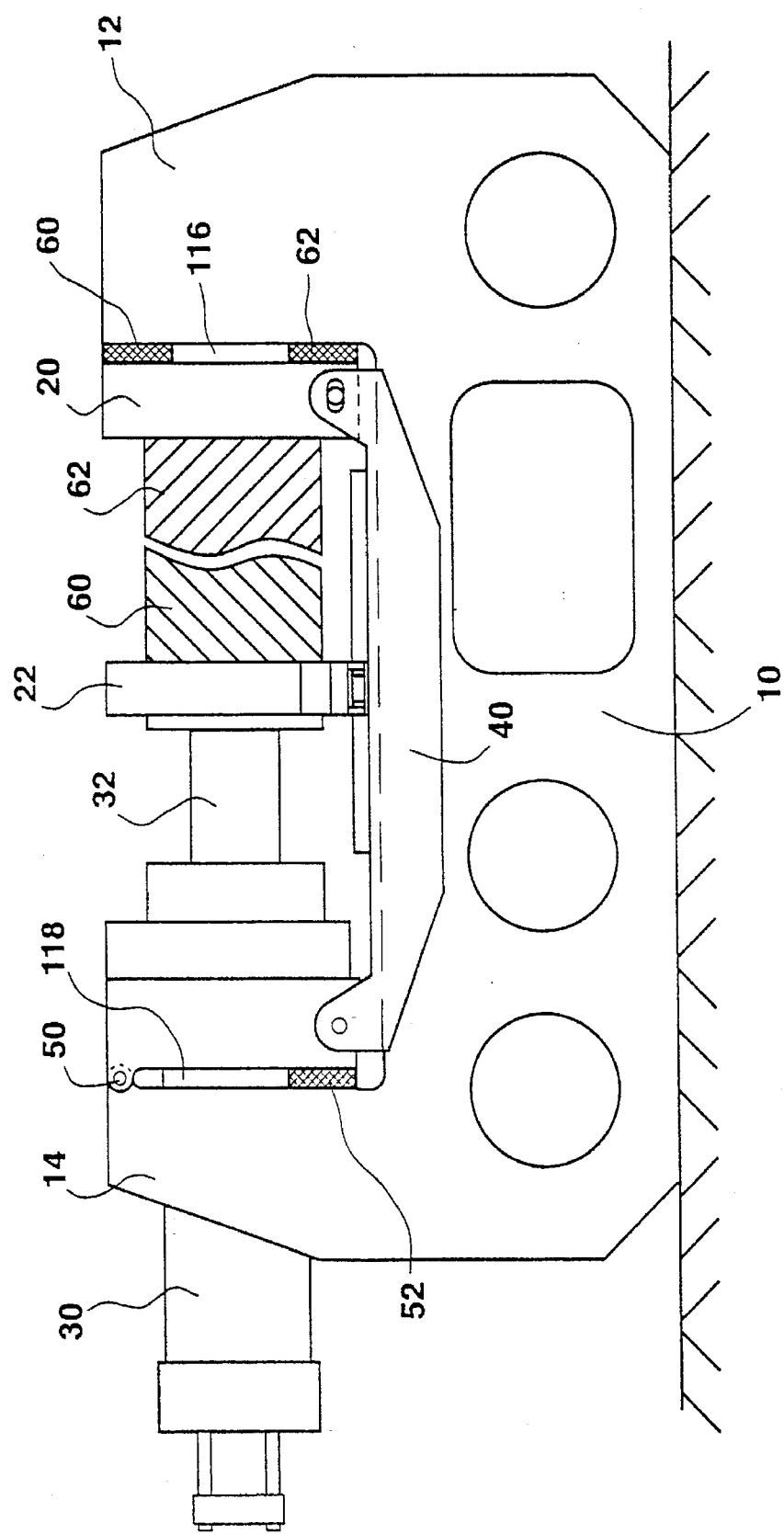
FIG. 4 is a from view of an alternative clamping assembly according to the present invention.

In alternative embodiments according to the present invention, cutouts 116 and/or 118 may take on a variety of other configurations, two of which are illustrated in FIG. 4.

Cutout 118 includes at its top a pivot 50 while at its bottom cutout 18 features an elastic member 52. The elasticity of elastic member 52 is such that when the assembly is stressed, the horizontal forces bring abbot a reversible compression of elastic member 52 so that the upper portion of second support post 14 rotates clockwise about pivot 50.

Cutout 116 includes at its top a top elastic member 60 while at its bottom cutout 116 features a bottom elastic member 62. The elasticity of bottom elastic member 62 is sufficiently larger than that of top elastic member 60 such that when the assembly is stressed, the horizontal forces bring about reversible compressions of top and bottom elastic members 60 and 62, with bottom elastic member 62 compression to a larger extent than top elastic member 60 so that the upper portion of first support post 12 rotates clockwise.

While the invention has been described with respect to a limited number of embodiments, it will be appreciated that many variations, modifications and other applications of the invention may be made.

What is claimed is:

1. A clamping assembly, comprising:
   (a) a base frame having a first end and a second end;
   (b) a first support post connected to, or integrally formed with, said first end of said base frame, said first support post having a first cutout;
   (c) a fixed platen connected to, or integrally formed with, said first support post;
   (d) a second support post connected to, or integrally formed with said second end of said base frame, said second support post having a second cutout;
   (e) a movable platen movably connected to said second support post; and
   (f) a support structure for slidably supporting said movable platen;
   wherein an upper portion of each of said first and second support posts located substantially above said first and second cutouts extends substantially horizontally so that a horizontally applied force tends to compress said upper portion while a lower portion of said first and second support posts located substantially below said first and second cutouts extends in an arcuate manner so that said horizontally applied force tends to bend, as well as compress, said lower portion.

2. The clamping assembly of claim 1, wherein said support structure for slidably supporting said movable platen is a floating support connected to said first and second support posts via a first and second floating support connections, respectively.

3. The clamping assembly of claim 2, wherein at least one of said first and second floating support connections is capable of horizontal movement.

4. The clamping assembly of claim 3, wherein said connection is a slidable connection.

5. The clamping assembly of claim 4, wherein one of said support posts features a laterally extending protrusion and wherein said floating support features a complementary slot in which said protrusion is slidable, said protrusion and said slot forming said slidable connection between said floating support and said one of said support posts.

6. A clamping assembly for injection molding apparatus, comprising:
   (a) a base frame having a first end and a second end;
   (b) a first support post connected to, or integrally formed with, said first end of said base frame;
   (c) a fixed platen connected to, or integrally formed with, said first support post;
   (d) a second support post connected to, or integrally formed with said second end of said base frame;
   (e) a movable platen movably connected to said second support post; and
   (f) a support structure for slidably supporting said movable platen, said support structure being a floating support connected to said first and second support posts via a first and second floating support connections, respectively.

7. The clamping assembly of claim 6, wherein at least one of said first and second floating support connections is capable of horizontal movement.

8. The clamping assembly of claim 7, wherein said connection is a slidable connection.

9. The clamping assembly of claim 8, wherein one of said support posts features a laterally extending protrusion and wherein said floating support features a complementary slot in which said protrusion is slidable, said protrusion and said slot forming said slidable connection between said floating support and said one of said support posts.

10. A clamping assembly, comprising:
   (a) a base frame having a first end and a second end;
   (b) a first support post connected to, or integrally formed with, said first end of said base frame, said first support post having a first cutout;
   (c) a fixed platen connected to, or integrally formed with, said first support post;
   (d) a second support post connected to, or integrally formed with said second end of said base frame, said second support post having a second cutout;
   (e) a movable platen movably connected to said second support post; and
   (f) a support structure for slidably supporting said movable platen;
   wherein an upper portion of each of said first and second support posts located substantially above said first and second cutouts is a pivot and a lower portion of said first and second support posts located substantially below said first and second cutouts is an elastic member, such that a horizontally applied force tends to compress said elastic member.

11. The clamping assembly of claim 10, wherein said support structure for slidably supporting said movable platen is a floating support connected to said first and second support posts via a first and second floating support connections, respectively.

12. The clamping assembly of claim 11, wherein at least one of said first and second floating support connections is capable of horizontal movement.

13. The clamping assembly of claim 12, wherein said connection is a slidable connection.

14. The clamping assembly of claim 13, wherein one of said support posts features a laterally extending protrusion and wherein said floating support features a complementary slot in which said protrusion is slidable, said protrusion and said slot forming said slidable connection between said floating support and said one of said support posts.

15. A clamping assembly, comprising:
   (a) a base frame having a first end and a second end;
   (b) a first support post connected to, or integrally formed with, said first end of said base frame;
   (c) a fixed platen connected to, or integrally formed with, said first support post, said first support post including a proximal first support post element located at or near a lateral edge of said fixed platen and a distal first support element located outwardly of said proximal first support post element;
   (d) a second support post connected to, or integrally formed with, said second end of said base frame;
   (e) a movable platen movably connected to said second support post, said second support post including a proximal second support post element located near a lateral edge of said movable platen when said movable platen is in a fully retracted condition and a distal second support post element located outwardly of said proximal second support post element; and
   (f) a support structure for slidably supporting said movable platen;

wherein said proximal and distal first support post elements are connected to each other by a first top elastic member and a first bottom elastic member, the elasticity of said first bottom elastic member being larger than the elasticity of said first top elastic member, while said proximal and distal second support post elements are connected to each other by a second top elastic member and a second bottom elastic member, the elasticity of said second bottom elastic member being larger than the elasticity of said second top elastic member.

16. The clamping assembly of claim 15, wherein said support structure for slidably supporting said movable platen is a floating support connected to said first and second support posts via a first and second floating support connections, respectively.

17. The clamping assembly of claim 16, wherein at least one of said first and second floating support connections is capable of horizontal movement.

18. The clamping assembly of claim 17, wherein said connection is a slidable connection.

19. The clamping assembly of claim 18, wherein one of said support posts features a laterally extending protrusion and wherein said floating support features a complementary slot in which said protrusion is slidable, said protrusion and said slot forming said slidable connection between said floating support and said one of said support posts.

* * * * *